US008577750B2

(12) United States Patent
Mourad et al.

(10) Patent No.: US 8,577,750 B2
(45) Date of Patent: Nov. 5, 2013

(54) CUSTOM HAIR COLORING SUPPLEMENTAL IDENTIFICATION

(75) Inventors: Tamim Mourad, Los Angeles, CA (US); Omar Mourad, Los Angeles, CA (US); Francisco Gimenez, Los Angeles, CA (US); Cory Rosenberg, Los Angeles, CA (US)

(73) Assignee: eSalon.com, LLC, Marina Del Rey, CA (US)

( * ) Notice: Subject to any disclaimer, the term of this patent is extended or adjusted under 35 U.S.C. 154(b) by 336 days.

(21) Appl. No.: 13/165,707

(22) Filed: Jun. 21, 2011

(65) Prior Publication Data

US 2011/0313879 A1     Dec. 22, 2011

Related U.S. Application Data

(60) Provisional application No. 61/357,032, filed on Jun. 21, 2010.

(51) Int. Cl.
*G06Q 30/00*     (2012.01)

(52) U.S. Cl.
USPC ....................................................... 705/26.5

(58) Field of Classification Search
USPC ................................. 705/26.5, 500
See application file for complete search history.

(56) References Cited

U.S. PATENT DOCUMENTS

| 4,434,467 | A  | * | 2/1984 | Scott ................................ 700/90 |
| 5,643,341 | A  | * | 7/1997 | Hirsch et al. ...................... 8/405 |
| 7,711,610 | B2 | * | 5/2010 | Iwaki et al. ................... 705/26.5 |
| 7,877,294 | B2 | * | 1/2011 | Inzinna, Jr. ................... 705/26.1 |
| 8,527,365 | B2 | * | 9/2013 | Pak ............................... 705/26.5 |
| 2002/0042958 | A1 | * | 4/2002 | Orr et al. ............................ 8/405 |
| 2003/0120534 | A1 | * | 6/2003 | Giacchetti et al. .............. 705/10 |
| 2003/0149504 | A1 | * | 8/2003 | Iwaki et al. .................... 700/117 |
| 2004/0163188 | A1 | * | 8/2004 | Firkins et al. ..................... 8/406 |
| 2004/0202686 | A1 | * | 10/2004 | Welch .......................... 424/401 |
| 2005/0036677 | A1 | * | 2/2005 | Ladjevardi .................... 382/162 |
| 2005/0165705 | A1 | * | 7/2005 | Lauper et al. ................. 705/500 |
| 2005/0228538 | A1 | * | 10/2005 | Limburger .................... 700/239 |

(Continued)

FOREIGN PATENT DOCUMENTS

EP          1817976 A1 *   8/2007
JP       2009301514 A  *  12/2009

OTHER PUBLICATIONS

Merriam-Webster's Collegiate Dictionary, Tenth Edition, 1997, p. 459.*

(Continued)

*Primary Examiner* — Nicholas D Rosen
(74) *Attorney, Agent, or Firm* — SoCal IP Law Group LLP; Jonathan Pearce; Steven C. Sereboff (57) ABSTRACT

There is disclosed a method for custom hair coloring formula supplemental identification. The method includes accepting a user login associated with previously entered user characteristics. Accepting user input of new user characteristics including natural hair color, current hair coloring, hair treatments, hair coloring characteristics and hair treatment characteristics. The method further includes identifying available hair coloring, accepting user input of desired hair coloring and identifying a hair colorant suitable to create the desired hair coloring in view of the user characteristics. An order is then generated for the hair colorant.

24 Claims, 6 Drawing Sheets

(56) References Cited

U.S. PATENT DOCUMENTS

| | | | |
|---|---|---|---|
| 2006/0033907 A1* | 2/2006 | Inzinna | 356/45 |
| 2006/0036454 A1* | 2/2006 | Henderson | 705/1 |
| 2006/0265244 A1* | 11/2006 | Baumann | 705/2 |
| 2009/0076639 A1* | 3/2009 | Pak | 700/106 |
| 2009/0218007 A1* | 9/2009 | Saranow et al. | 141/104 |
| 2009/0248199 A1* | 10/2009 | Milhorn | 700/239 |
| 2010/0088036 A1* | 4/2010 | Goddard-Clark et al. | 702/19 |
| 2011/0220139 A1* | 9/2011 | Samain | 132/200 |
| 2011/0313885 A1* | 12/2011 | Mourad et al. | 705/26.41 |

OTHER PUBLICATIONS

Anon., "Ultress Customized Hair Color Personalized Consumers Shade agreement," FDC Reports—The Rose Sheet, Apr. 19, 1999, p. 3.*

Anon., "DrugEmporium.com Launches New Beauty Counter," PR Newswire, Jun. 1, 2000.*

Anon., "Top Notes," WWD, Dec. 14, 2001, p. 8.*

Kroll, L., "Fresh Face, A," Forbes, vol. 170, No. 1, p. 66, Jul. 8, 2002.*

* cited by examiner

CUSTOM HAIR COLORING SUPPLEMENTAL IDENTIFICATION

RELATED APPLICATION INFORMATION

This patent claims benefit of the filing date of Provisional Patent Application No. 61/357,032, filed Jun. 21, 2010.

This patent is related to co-pending patent application owned by the assignee of record of the present application; the co-pending patent application with Ser. No. 13/165,645 filed on Jun. 21, 2011 and entitled "Custom Hair Coloring Identification".

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to custom hair coloring formula supplemental identification.

2. Description of the Related Art

A multitude of individual characteristics must be taken into account in order to appropriately select a hair colorant. These include the current hair color, any current coloration or treatment of the hair, the time frame of the coloration or treatment, the desired hair color, the ability of the hair to take colorations and other treatments and numerous other user characteristics.

Prior art systems have relied upon the user to know each of these characteristics and the way in which they bear upon the selection of a hair colorant selection. Alternatively, a user may rely upon a stylist's professional evaluation and opinion.

In automated systems, such as the system described in the related application identified above, the user is relied-upon in order to input all of the relevant statistics. However, the user may be incapable of accurately knowing each of these characteristics without some experience. These systems also rely upon graphics and prompts reproduced on a computer screen that may or may not accurately reflect the user's current hair coloring or the desired hair coloring.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
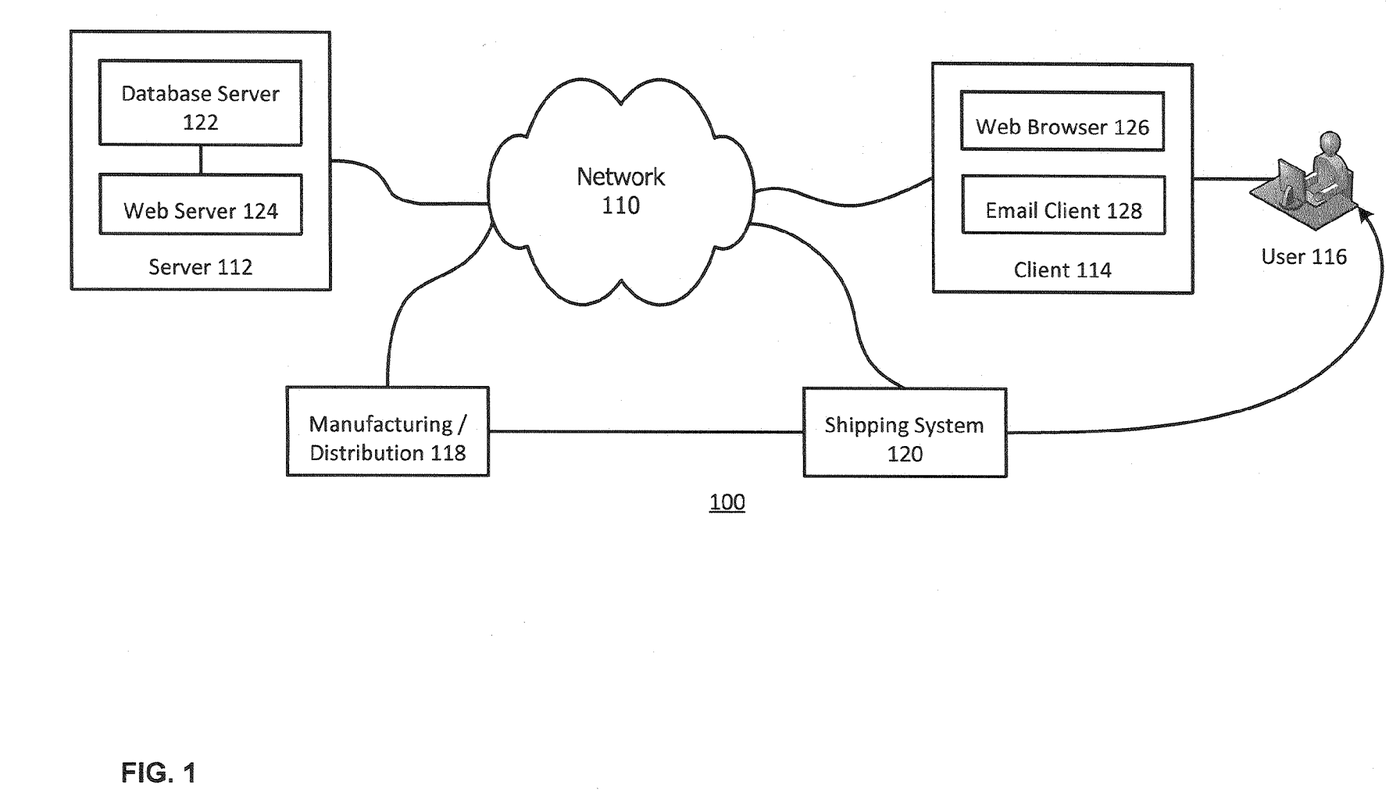
FIG. 1 is a schematic of the custom hair coloring formula supplemental identification system.

Turning now to FIG. 1, a schematic of the custom hair coloring formula supplemental identification system is shown. The system 100 includes a network 110, connected to a server 112, a client 114, manufacturing/distribution 118 and a shipping system 120. A user 116 accesses the network 110 via the client 114. The server 112 includes a database server 122 and a web server 124. The client 114 includes a web browser 126 and an email client 128.

The network 110 connects to the server 112. The server 112 is shown as a single server incorporating a database server 122 and a web server 124. The server 112 may actually be a number of interrelated servers and computing resources. In this way, the database server 122 may be a stand-alone server separate and apart from the web server 124. The database server 122 and web server 124 may also be made up of a number of physical servers, each logically linked and operating in concert.

The server 112, however physically configured, is responsible for accessing the database server 122 databases to thereby provide the web server 124 with information to fill web pages served to the client 114. These databases may contain information related to the hair products to be used, the various hair styles, colors and other user characteristics that may have an effect on the user 116 selection.

The user 116 accesses the server 112 using the client 114 connected to the network 110. The client incorporates a web browser 126 for accessing web pages served by the web server 124. The client 114 also includes an email client 128 for receipt of emails from the server 112 or the shipping system 120.

The manufacturing/distribution 118 is representative of the process of creation, storage and allocation of the selected product for the user 116. Orders are transmitted from the server 112 to the manufacturing distribution 118 via the network 110. The manufacturing/distribution 118 may also include the capability to send email such as order confirmation to the client 114 for review by the user 116 using the email client 128. The shipping system 120 is also connected to the network 110. It may also be directly connected to the manufacturing/distribution 118. The shipping system 120 may also include the capability to send email, such as order or shipment confirmation, to the client 114 for receipt by a user 116 via the email client 128.

Figure 2:
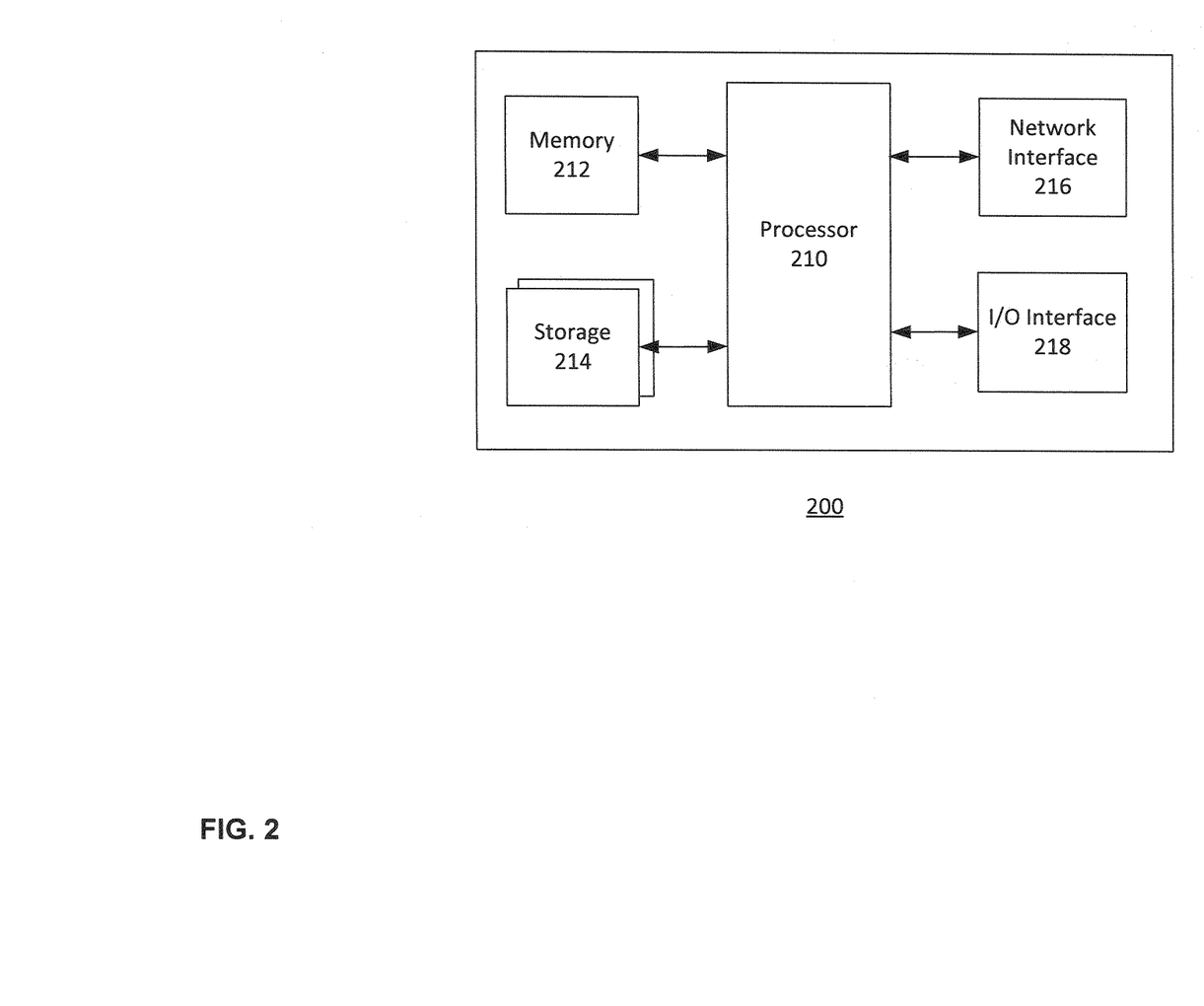
FIG. 2 is a diagram of a computing device.

Turning now to FIG. 2 there is shown a computing device 200, which is representative of the server computers, client devices, mobile devices and other computing devices discussed herein. The computing device 200 may include software and/or hardware for providing functionality and features described herein. The computing device 200 may therefore include one or more of: logic arrays, memories, analog circuits, digital circuits, software, firmware and processors. The hardware and firmware components of the computing device 200 may include various specialized units, circuits, software and interfaces for providing the functionality and features described herein.

The computing device 200 has a processor 210 coupled to a memory 212, storage 214, a network interface 216 and an I/O interface 218. The processor may be or include one or more microprocessors, field programmable gate arrays (FP- GAs), application specific integrated circuits (ASICs), programmable logic devices (PLDs) and programmable logic arrays (PLAs).

The memory 212 may be or include RAM, ROM, DRAM, SRAM and MRAM, and may include firmware, such as static data or fixed instructions, BIOS, system functions, configuration data, and other routines used during the operation of the computing device 200 and processor 210. The memory 212 also provides a storage area for data and instructions associated with applications and data handled by the processor 210.

The storage 214 provides non-volatile, bulk or long term storage of data or instructions in the computing device 200. The storage 214 may take the form of a disk, tape, CD, DVD, or other reasonably high capacity addressable or serial storage medium. Multiple storage devices may be provided or available to the computing device 200. Some of these storage devices may be external to the computing device 200, such as network storage or cloud-based storage.

The network interface 216 includes an interface to a network such as network 110 (FIG. 1).

The I/O interface 218 interfaces the processor 210 to peripherals (not shown) such as displays, keyboards and USB devices.

Description of Processes

Figure 3:
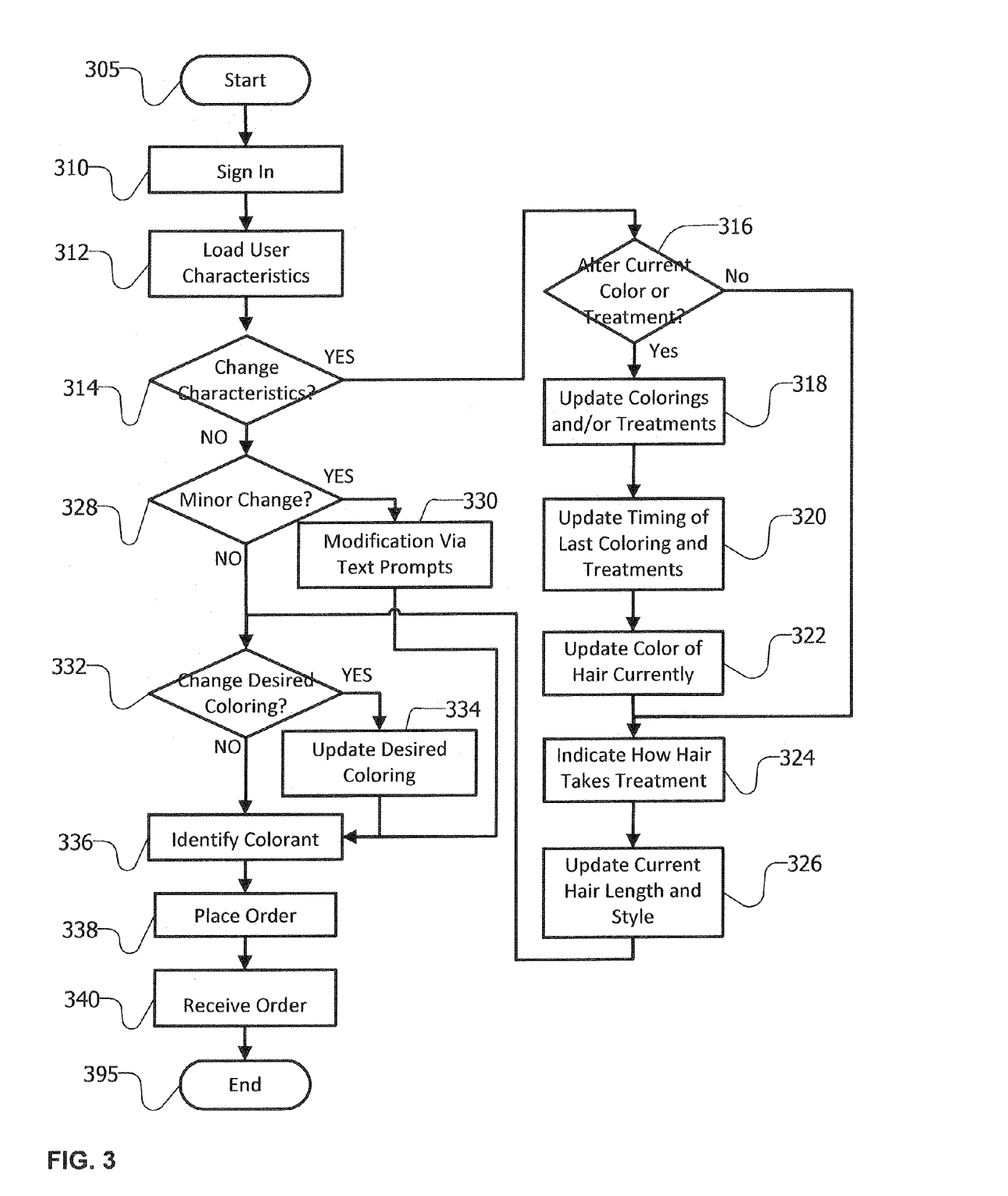
FIG. 3 is a flowchart of user input and selection.

Turning now to FIG. 3, a flowchart of user input and selection is shown. The system 100 of FIG. 1 may be used in this process. A user may first sign into the system at 310. This process utilizes an individually-identifying login and, typically, a password. Once a user has logged in, the system is capable of uniquely identifying that individual. If the user has previously used the system to prepare hair colorant, then the system will have data pertaining to the user's hair characteristics. The individually-identifying login may be associated with a user based upon a prior visit to a salon in which a prior treatment or hair dye was applied.

These user characteristics are loaded at 312. In this process, the user's base hair color, prior colorings, the presence of roots, the way in which a user's hair takes treatments, the prior color selected and the colorant combination used to achieve that color, the presence of gray in the hair and various other information pertaining to the user's hair are loaded. In addition, the system may be capable of calculating the current status of a user's hair based upon the time of the last coloration. So, for example, if it has been several months since the last coloration, the user's characteristics may be updated automatically to incorporate roots of the user's natural hair color. In this way, the user may avoid entering the information a second time.

Initially, a user is presented with the opportunity to indicate whether or not any changes have been made since the last coloration and, if so, to change user characteristics at 314. If so, the user characteristics may require more than a small revision or may have been input incorrectly by the user or based upon the limitations of the user's display. For example, the user may have selected a desired hair color corresponding to a light red on the user's screen. Once the hair colorant was applied, the selected hair colorant resulted in a strawberry blonde coloration of the user's hair. This information in tangible form may be understood by the user as an indication that the user's input base color or the desired color as input initially are too light. Alternatively, the user's hair may take hair colorant less-well than initially thought. Any of these may be a function of the user's display inaccurately reproducing colors used to perform prior selections. The user may now adjust the selected hair colorant, reset the base color or adjust the way in which a user's hair takes treatment in order to compensate.

If the user desires more extensive changes to the previously-entered characteristics, they may indicate a desire to do so at 314. Any one of 316 through 326 may be skipped or remain unchanged by the user if desired. However, the user will be presented with the opportunity to make changes in response to the indication that the user wishes to change characteristics at 314. The user may first be presented with a summary of the stored user characteristics loaded at 312 so that the user may determine whether or not change of those characteristics at 314 is desired.

If refinement of the characteristics is desired, the user may indicate whether or not the hair is currently colored or treated at 316. If so, the user will be directed to update the colorings and/or treatments at 318. The coloring types may include permanent dyes, demi-permanent dyes, temporary dies, visible highlights, visible lowlights, metallic dyes, color restorers or henna. The treatment types may include Brazilian keratin treatment, hair color remover, chemical relaxer, hair bleaching or a perm. In both cases, the user may indicate that no treatment or coloring has been applied to the hair. The user's refinement of the colorings and/or treatments will enable the system to better select appropriate colorants for use in the hair.

If the user indicated that their hair was currently colored and/or treated 318, the user may update the time during which the last treatments were applied to the hair at 324. The user may be presented with a series of checkboxes indicating various time-frames. Alternatively a slider bar representing a timeline may be used. At this stage, the direction of coloring (lighter or darker) may also be indicated by the user. These details will further enable the system to better select an appropriate colorant to reach the desired hair color.

If the user indicates a desire to alter the current hair color or treatment at 316 or if has been long since the user last colored their hair, the user may then update the color of their hair currently at 322. The user's prior selections will be shown to the user, but this provides the user the opportunity to update the system information to the exact current color of their hair. The prior selections will include the color to which the user's hair was dyed previously. If the user's hair failed to take the coloration fully, or if it resulted in a slightly different color than desired, the user may update the current color now in order to reflect the "real-world" coloration and treatment status of the hair.

Similarly, the user may have dyed or treated their hair since the application of the most recent treatment. The user may refine the current color and treatment status of the hair to show this change at 322. In cases in which the hair was colored some time ago, the coloring using the system or through another means may have faded such that the user's hair is now darker or lighter than it was prior to coloring, but not yet fully-returned to normal hair color. This may also be indicated by a user.

If the hair is not currently treated or after selection of the current hair color, if it is currently treated, the user may next revise how the hair takes a treatment at 324. In this stage, the user may indicate that the hair takes treatment normally, doesn't take color well, that the user has fine hair or that the hair takes treatment faster than normal hair. The user may have developed a different understanding of the way in which their hair takes treatment or color in view of the previous treatment or treatments. The user may also indicate how often their hair is typically treated. Each of these indicia also provide additional basis used by the system to select the most appropriate colorant to achieve the desired hair color.

Next, the user may update their current hair length and style at 326. For example, the user may have cut their hair since the last application or have grown it out. The system may ask a user to indicate that their hair is shorter than 3 inches, between three inches and shoulder-length, shoulder length, or longer than shoulder length. A series of checkboxes, radio buttons or a slider bar may be used to generate this indication. The user's prior selections will be shown to the user before changes are made. The style choices may include straight, wavy or loose curls, defined curls or tight curls. Additional styles may also be selected. The user may also indicate whether or not their hair style includes layering. As above, photographic representations of each selection may be provided to aid a user in selection. These indicia will enable the system to further identify the appropriate hair colorant to achieve the desired hair color.

If the user indicates that there were no changes to user characteristics at 314, the user is presented with the opportunity to make a minor change to the hair colorant at 328. If a user so elects, the user may be presented with a series of text-based prompts asking whether the user wishes to add more gray coverage or to change a tone. Alternatively or in addition, a user may be asked to slightly deepen a color, deepen the color to a greater degree, to brighten the color, to provide less copper or gold tone or to keep the same color. In this way, the user may modify the hair colorant as guided by a text-based system via text prompts at 330. These modifications may be slight to the prior order and enable a user to make very quick and pointed changes before placing a reorder.

The hair colorant formulation that is selected may be varied slightly through the user's indications in response to a series of prompts presented at 330. This alteration may apply one of a number of minor changes to the colorant without altering the user's underlying user characteristics. In this way, the user can customize their desired hair colorant based upon their own experience using words rather than images.

Next, the user may indicate a desire to select a different desired hair coloring at 332. First, the user may be presented with the prior hair coloring selection. At this stage, the user may realize that the prior hair coloring selection was too dark or too light, perhaps in view of the user's real-life understanding of the level of coloration provided by the selected hair colorant. The user may compensate, based upon that experience to select a darker or lighter desired hair color.

If the user wishes to change the desired hair coloring at 332, the user is presented with a list of available shades. The shades may be shown as swatches of colored hair on a screen. The swatches that the user has selected as their natural hair color and their dyed hair color may be indicated on the screen. The user may select one of the swatches and an on-screen image of an individual with hair of that color may be shown to the user.

Hair colors that are not suitable in view of the various user characteristics input throughout the above process may be made unavailable to the user. For example, a user typically is not able to lighten their natural hair more than a few shades. Shades drastically lighter than the user's current hair will not be available to a user for selection. In addition, a user cannot choose any shade lighter than their current dyed color.

If the user wanted to update the desired coloring at 332, then they will be provided an opportunity to do so at 334. This process may involve a display of a base color, such as brown, blonde or red. Next, the user may select a specific color from among those associated with the base color. In some cases, updates to the characteristics may alter the colors available to a user, for example, if a user has since dyed their hair very dark, a light blonde color may no longer be available to them. In these cases, the user may be required to update their desired coloring in view of these changes.

The hair color, dyed hair color and desired hair color may be identified using a numerical values such as those in Table 1 and Table 2 below.

TABLE 1

| Number | Shade |
|---|---|
| 2 | Soft Black |
| 3 | Darkest Brown |
| 4 | Dark Brown |
| 5 | Medium Brown |
| 6 | Light Brown |
| 7 | Dark Blonde |
| 8 | Medium Blonde |
| 9 | Light Blonde |
| 10 | Lightest Blonde |

Table 1 is an example of numbers that may be used to represent the base hair colors.

TABLE 2

| Sub-Number | Tone |
|---|---|
| X.0 | Neutral |
| X.01 | Natural Ash |
| X.03 | Natural Golden |
| X.04 | Natural Copper |
| X.1 | Ash |
| X.10 | Blue |
| X.12 | Ash Pearl |
| X.13 | Cool Beige |
| X.14 | Copper Ash |
| X.15 | Chocolate |
| X.20 | Intense Pearl |
| X.21 | Pearl Ash |
| X.23 | Pearl Golden |
| X.24 | Pearl Copper |
| X.25 | Pearl Mahogany |
| X.26 | Pearl Red |
| X.3 | Golden |
| X.31 | Warm Beige |
| X.32 | Golden Pearl |
| X.34 | Golden Copper |
| X.35 | Golden Mahogany |
| X.4 | Copper |
| X.40 | Intense Copper |
| X.41 | Copper Ash |
| X.43 | Copper Golden |
| X.45 | Copper Mahogany |
| X.5 | Mahogany |
| X.54 | Mahogany Copper |
| X.56 | Mahogany Red |
| X.6 | Red |
| X.60 | Intense Red |
| X.64 | Red Copper |
| X.65 | Red Mahogany |
| X.71 | Matte Ash |

Table 2 is an example of the sub-numbers such that the X may be replaced with the number representative of one of the base colors of Table 1. In combination a number associated with a base color of Table 1 and a sub-number associated with a tone of Table 2 may be used to represent natural hair colors, currently-dyed hair colors or desired hair colorations.

Once the user has indicated a desire to use the prior desired hair color, updated the desired hair color or made a minor change, a suitable hair colorant formulation is identified by the system at 336. This formulation and selection process is shown below with reference to FIG. 4. The user is then presented with the opportunity to place an order at 338 for the hair colorant. The user may be presented with different options for the hair colorant, such as demi-permanent or permanent colorant. In some situations, such as when a user wishes to move to a lighter hair color, demi-permanent colorants are not available.

Once the ordered is placed, the order is processed, shipped and received by the user at 338. At this stage, the order is passed on to manufacturing/distribution 118 for allocation and fulfillment of the order. The hair colorant is then provided to a shipping system 120 for delivery to a user 116 (FIG. 1). The user may receive one or more emails confirming that the order is placed, that the order has been filled and that the order has been shipped. The user then receives the order at 340.

Throughout this process, the system 100 may provide advice to the user on how to use the system and information pertinent to the hair coloration process. Help links or popups may be presented to the user in order to aid in identifying hair colors, treatments, hair styles and other characteristics. These links or popups may provide information pertaining to hair treatment, such as suggestions as to the timing of hair coloration after certain treatments or previous coloration. These links or popups may also aid users in indicating why certain colors are unavailable to them.

The flow chart has both a start 305 and an end 395, but a user may return to the start of the process or earlier stages in the process at any time. In addition, multiple users may be in various stages of the process simultaneously.

Figure 4:
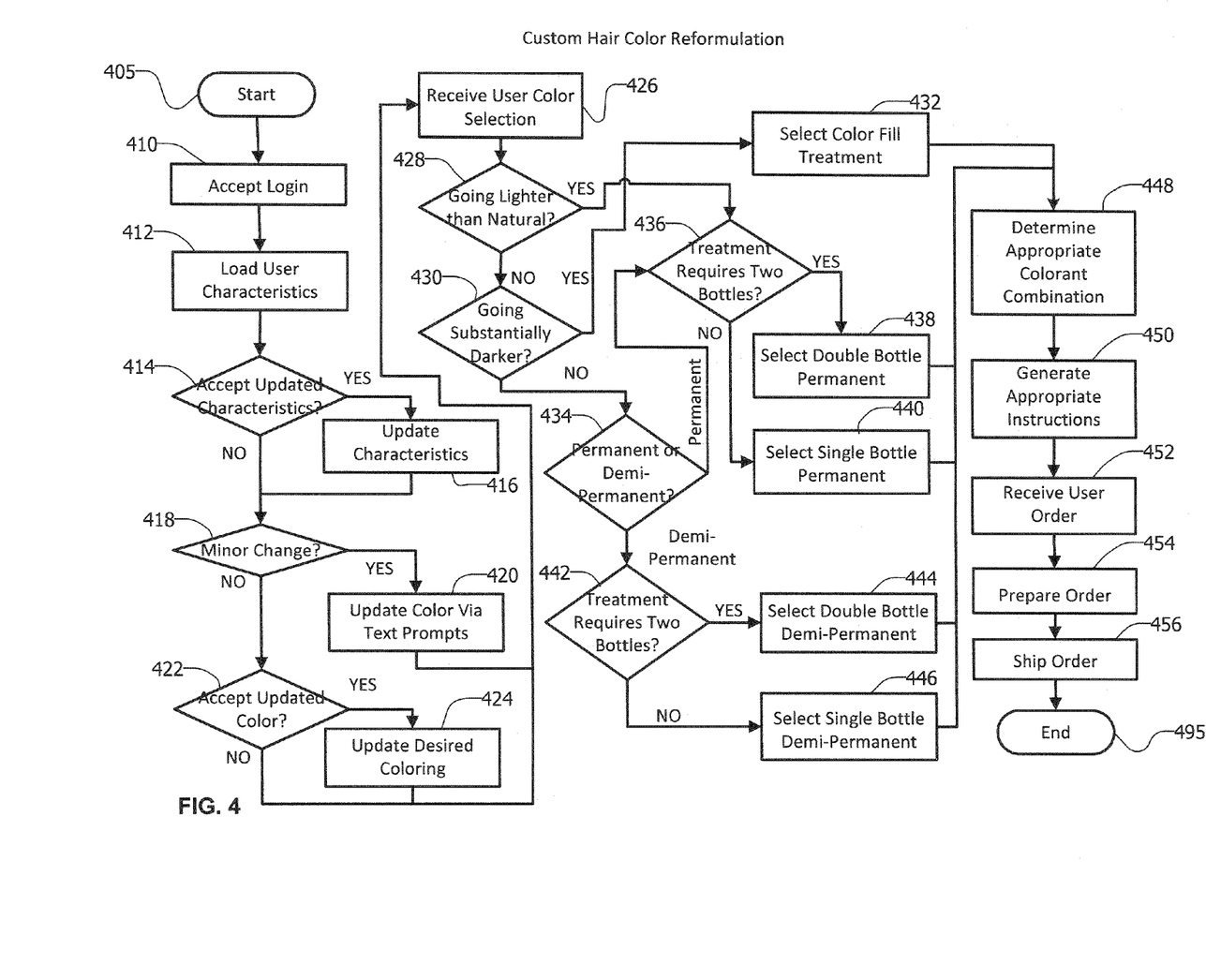
FIG. 4 is a flowchart of custom hair coloring formula supplemental identification.

Turning now to FIG. 4, a flowchart of custom hair coloring formula supplemental identification is shown. The server 112 may first accept a user login into the system at 410. This process may include the use of a user name, customer number, email address or other unique identifier and an associated password. The customer number may be associated with a user based upon a prior visit to a salon in which a prior treatment or hair dye was applied. The user name, customer number, email address or other unique identifier may have been created on a prior visit to the associated system.

Previously input user characteristics are then loaded 412 by the server 112 (FIG. 1). The user name, customer number, email address or other unique identifier are associated with user characteristics such as natural hair color, current hair color, grey levels in hair, current hair treatments, dates of the last hair treatment or coloring, current hair styles, the desired hair coloring and various other characteristics. In this way, the user need not input all user characteristic information in order to reorder hair colorant.

The system first provides an opportunity for the user to indicate that there are changes to the underlying user characteristics at 414. If so, the user is presented with the opportunity to update user characteristics as described with reference to elements 316 to 326 of FIG. 3.

If there are no changes to user characteristics at 414, then the user is presented with the opportunity to make a minor change to the hair colorant at 418. A minor change is a slight modification of the hair colorant without reference to the underlying user characteristics. Examples of minor changes include making the hair slightly darker, slightly lighter, slightly deeper, providing more or less of a tone to the hair colorant or providing more gray coverage. The user will be lead to make a minor change via a series of text prompts at 420.

Next, the server may accept an updated desired hair coloring at 422. At this stage, the user may select a different desired hair coloring than that previously selected. A user may be forced to select a different color if changes to the user's hair have made the previously-used color unattainable. Alternatively, a user may simply wish to adjust the color slightly. This adjustment may be in view of user experience with a prior hair colorant application. The user may be presented with a number of checkboxes or maybe presented with a series of images, either associated with each option. The user may choose the same color thereby essentially bypassing this option. The opportunity to change characteristics, to make a minor change or to change the desired hair coloring may be presented to the user at the same time.

In each selection, a user may be presented with a series of checkboxes corresponding to each category of user characteristic that the user previously entered and that is not associated with the user upon login. Using these checkboxes, the user may indicate that one or more of the following has changed: that the hair was colored since the last hair colorant selection, that the hair length or style changed since the last hair colorant selection, that a chemical treatment was applied since the last chemical treatment, that the hair takes treatments or is otherwise different than previously indicated or that nothing has changed regarding the hair. Similarly, a user may request to update user characteristics such as base color, the way in which a user's hair takes treatment or the desired hair color based upon a better understanding of the hair coloration process as a result of the user's experience with a prior hair coloration process.

As a result of any changes to the user characteristics or the desired coloring, the user's characteristics are updated to include the new desired coloring at 424. The user's color selection, received from making a minor change at 420, from updating the desired coloring at 424 or from electing not to update the desired coloring at 422 is received by the system at 426. Regardless of whether the user's color selection has changed, the hair colorant suitable to create the desired hair coloring may change as a result of the updated user characteristics.

First, a user's natural hair color is taken into account to determine if they are going lighter than natural at 428. Natural (undyed) hair can be lightened by two shades (see Table 1 above) and darkened as desired. If the desired hair color is lighter than their natural hair color, the user is required to use permanent color. Next, input of whether their hair is currently dyed is taken into account. If the user's desired color is substantially darker at 430 than their dyed color, or if the user has highlights, then the user is required to use a color fill treatment at 432.

If the user characteristics indicate negative responses at 428 and 430, then the user may be presented with a choice of whether to receive a permanent dye or a demi-permanent dye at 434. Next, at 436 and 442, a determination is made on whether the user requires 1 or 2 bottles of color. The two factors which impact this determination are the length of the user's hair and the color difference between their dyed color and desired color. If the user has long hair and requires color to be added to their current dyed hair, then two bottles are required at 438, 444. If the user has chosen a color substantially different from their current dyed color, then two bottles are required because of the necessity to formulate differently for the natural color and their current dyed color at 438, 444. Otherwise, in most other cases one bottle of hair color is sufficient for the user to achieve their desired color goal at 440, 446.

The formulation of the colorant itself at 448 is also affected by the user input characteristics. In the present system, colorants are classified into one of 172 different colors, each with four associated variations. These variations could include more or less of the particular tone in the selected color, half-shades lighter and darker or the addition of a neutralizing color or other color to counter unwanted pre-existing tones in the hair or current dye. The appropriate colorant combination for a user is determined at 448 based upon a table similar to the following Table 3. The combinations of Table 3 are only examples. Different or additional combinations may be used.

TABLE 3

| Criteria | Bottle 1 | Bottle 2 |
| --- | --- | --- |
| Target Color is not a "Vibrant" Color + Non-Neutral Color | 100% Target Color | 40% Target Tone and 60% Target Color |
| Target Color is not a "Vibrant" Color + Neutral Color | 100% Target Color | 100% Target Color |
| Dyed Hair = Target Color and Target Color is Vibrant and the Target Color is less than 8 and Hair is Currently Dyed | 100% Target Color | 100% Target Tone |
| Dyed Hair = Target Color and Target Color is Vibrant and the Target Color is greater than or equal to 8 and Hair is Currently Dyed | 100% Target Color | 60% Target Tone and 40% Target Color |
| Target Color is to be more than one shade lighter than Currently Dyed Hair and Target Color is "Vibrant" and Hair is Currently Dyed | 100% Target Color | 60% Target Tone and 40% Target Color |
| Hair is Not Dyed and Target Color is "Vibrant" | 100% Target Color | 40% Target Tone and 60% Target Color |
| Hair is Not Dyed and Target Color and Tone Combination is 7.60 or 7.40 | 100% Target Color | 100% Target Tone |
| Dyed Color is a Color Correction | 100% Target Color | 100% Target Color Correction |
| Treatment is Single Bottle Demi-Permanent or Permanent Treatment | 100% Target Color | N/A |
| Treatment is a Color Fill and Includes Mahogany Tones | 100% Mahogany Tone | 100% Target Color |
| Treatment is a Color Fill and Includes Gold Tones | 100% Gold Tone | 100% Target Color |

The available treatments for applying the hair colorant are a function of the various user-input characteristics. The available treatment type is function of the current color, the target color, the hair texture, hair length, hair tone, root level and whether the colorant process is the first colorant application using this system or a repeat application. Additional factors may also be relevant and applied by the algorithm. The algorithm then utilizes these variables to derive a suitable treatment type.

For example, if a user desires to move to a lighter shade relative to their natural color, then a permanent dye coupled with a developing agent are required. Another treatment example is where the user has highlights, and where they opted to cover the highlights. The user is required to use a two process color fill treatment where they first pre-pigment their highlights with the natural underlying pigment present in that shade level, and then apply the desired final color. To do otherwise would result in an unnaturally flat-looking hair color.

In addition already dyed hair will react differently to the application of colorant than un-dyed hair. As such, a user seeking to color hair that is already colored may be required to apply different treatments to their roots and dyed hair. In some cases, the roots may be given a colorant directly to the desired color while the already-dyed hair will be given a different colorant based upon that dyed color.

In another example, if a user wishes to change from a dyed color of a medium brown with a red tone to just a medium brown, then the user will be asked whether they prefer a pure medium brown or a medium brown with some remaining warmth (slight redness). If they choose a pure medium brown, then a countering color may be added to the formulation. In order to determine the proper countering color, general color theory is used to offset the red tone. In this example a certain amount of green is added to the medium brown color to counter the red tone present in their already dyed hair.

In yet another example, transitioning hair from a darker color to a lighter color exposes more of the hair's natural undertones. Accordingly, a neutralizing or offsetting color may be added to the hair colorant in order to counter other colors in the formulation. Additionally the texture of the hair, fine or coarse, thick or thin, has an effect on the extent to which the lightening happens in the hair. If the hair is thicker, for example, it will require a stronger formulation of colorant than thinner hair.

If a user has dyed their hair a darker shade since the application of the last hair colorant, a brighter-than-previously-identified shade of hair colorant may be required to bring the hair coloring back to the desired hair coloring. Similarly, if a user has bleached the colorant out of their hair since the last application of hair colorant, a darker colorant, pre-treatment or both may be required to bring the hair back to the desired hair coloring.

The final element dependent upon the user-input characteristics is the set of instructions that accompany the hair colorant provided to the user. Instructions are generated at 450. Depending upon the user-input characteristics and the formulation necessary to deal with those characteristics, different instructions will be automatically generated for the user. Table 4 below is an example of a table that may be used to generate suitable instructions. Other instructions, different or additional instructions for different user characteristics may be used.

TABLE 4

| Treatment Type | Hair Characteristics | Instructions | Instruction Set |
| --- | --- | --- | --- |
| Double Bottle Permanent | Virgin + Not Damaged | 2B Roots (30) Ends (30) | 8 |
| Double Bottle Permanent | Virgin + Damaged | 2B Roots (30) Ends (10) | 9 |
| Double Bottle Permanent | Not Virgin + target_tone_intensity = strong | 2B Roots (30) Ends (30) | 8 |
| Double Bottle Permanent | Not Virgin + target_tone_intensity = strong + damaged | 2B Roots (30) Ends (10) | 9 |
| Double Bottle Permanent | Not Virgin + Color Match + target_tone_intensity in (none, slight) | 2B Roots (30) Ends (5) | 10 |
| Double Bottle Permanent | Not Virgin + Color Match + target_tone_intensity = Medium + Damaged | 2B Roots (30) Ends (5) | 10 |
| Double Bottle Permanent | Not Virgin + Color Match + target_tone_intensity = Medium + Not Damaged | 2B Roots (30) Ends (10) | 9 |
| Double Bottle Permanent | Not Virgin + Not Color Match + (dyed_level = target_level) + target_tone_intensity in (Negative, None, Slight) + dyed_tone_intensity in (medium, strong) | 2B Roots (30) Ends (10) | 9 |
| Double Bottle Permanent | Not Virgin + Not Color Match + (dyed_level = target_level) + target_tone_intensity = Medium | 2B Roots (30) Ends (10) | 9 |
| Double Bottle Permanent | Not Virgin + Not Color Match + (dyed_level = target_level) + target_tone_intensity in (Negative, None, Slight) + dyed_tone_intensity in (Negative, None, Slight) | 2B Roots (30) Ends (5) | 10 |

TABLE 4-continued

| Treatment Type | Hair Characteristics | Instructions | Instruction Set |
|---|---|---|---|
| Double Bottle Permanent | Not Virgin + Not Color Match + (dyed_level − target_level >= 1) AND target_level < 7) | 2B Roots (30) Ends (10) | 9 |
| Double Bottle Permanent | Not Virgin + Not Color Match + (dyed_level − target_level = 1 AND target_level >= 7) and target_tone_intensity in (Negative, None, Slight) + dyed_tone_intensity in (Negative, None, Slight) | 2B Roots (30) Ends (5) | 10 |
| Double Bottle Permanent | Not Virgin + Not Color Match + (dyed_level − target_level = 1 AND target_level >= 7) and target_tone_intensity in (Negative, None, Slight) + dyed_tone_intensity in (medium, strong) | 2B Roots (30) Ends (10) | 9 |
| Double Bottle Permanent | Not Virgin + Not Color Match + (dyed_level − target_level = 1 AND target_level >= 7) and target_tone_intensity = medium | 2B Roots (30) Ends (10) | 9 |
| Double Bottle Permanent | Not Virgin + Not Color Match + (dyed_level − target_level >= 2) AND target_level >= 7) | 2B Roots (30) Ends (10) | 9 |
| Single Bottle Permanent | Color Match + Not Virgin + Not Short + Not Faded + Not Root-touchup | 1B Roots (30) | 1 |
| Single Bottle Permanent | Color Match + Not Virgin + Not Short + Faded + Intense | 1B Roots (30) Ends (30) | 2 |
| Single Bottle Permanent | Color Change Major + Not Virgin + Not Short Hair | 1B Roots (30) Ends (30) | 2 |
| Single Bottle Permanent | Color Match + Not Virgin + Faded + Not Intense + Not Short + Not Damaged + Not root-touchup | 1B Roots (30) Ends (10) | 3 |
| Single Bottle Permanent | Color Change Basic + Not Virgin + Not Short Hair + Not Damaged + Not Color Change Minor + Not root-touchup | 1B Roots (30) Ends (10) | 3 |
| Single Bottle Permanent | Virgin + Damaged + Not Short + Not root-touchup | 1B Roots (30) Ends (10) | 3 |
| Single Bottle Permanent | Color Match + Not Virgin + Faded + (Not Intense or Not Medium Intense) + Not Short + Damaged | 1B Roots (30) Ends (5) | 4 |
| Single Bottle Permanent | Color Change Basic + Not Virgin + Not Short Hair + Damaged | 1B Roots (30) Ends (5) | 4 |
| Single Bottle Permanent | Color Change Minor + Not Virgin + Not Short Hair + Not Damaged | 1B Roots (30) Ends (5) | 4 |
| Single Bottle Permanent | Virgin + Not Short + Not Damaged | 1B Ends (30) Roots (30) | 5 |
| Single Bottle Permanent | Short + Not root-touch-up | 1B All (30) | 6 |
| Single Bottle Permanent | root-touch-up | 1B Roots (30) No Emulsion | 7 |
| Double Bottle Demi-Perm | color_match + Faded + Not Intense + Not Virgin | 2B Roots(15) Ends (5) | 29 |
| Double Bottle Demi-Perm | color_match + Not-Faded + Intense + Not Virgin | 2B Roots(15) Ends (5) | 29 |
| Double Bottle Demi-Perm | color_change_basic | 2B Roots(15) Ends (5) | 29 |
| Double Bottle Demi-Perm | color_match + Faded + Intense + Layers | 2B Roots (15) Ends (15) | 12 |
| Double Bottle Demi-Perm | color_change_major + Layers + Non-Neutral | 2B Roots (15) Ends (15) | 12 |
| Double Bottle Demi-Perm | Virgin + (7.40 or 7.60) | 2B Roots (15) Ends (15) | 12 |
| Double Bottle Demi-Perm | color_match + Faded + Intense + No Layers | 2B All (15) | 13 |
| Double Bottle Demi-Perm | color_change_major + Neutral | 2B All (15) | 13 |
| Double Bottle Demi-Perm | color_change_major + No Layers + Non-Neutral | 2B All (15) | 13 |
| Double Bottle Demi-Perm | Virgin + ! = (7.40 or 7.60) | 2B All (15) | 13 |
| Double Bottle Demi-Perm | Virgin + Non-Neutral + No Layers | 2B All (15) | 13 |
| Single Bottle Demi-Perm | Color Match + Not Faded + Not short hair + Not root-touchup | 1B Roots (15) | 14 |
| Single Bottle Demi-Perm | Color Change Major + Not short hair + Not root-touchup | 1B All (15) | 15 |
| Single Bottle Demi-Perm | (Virgin or Short Hair) + Not root-touchup | 1B All (15) | 15 |
| Single Bottle Demi-Perm | Color Match + Faded Intense + Not short hair + Not root-touchup | 1B All (15) | 15 |
| Single Bottle Demi-Perm | root-touch-up | 1B Roots (15) No Emulsion | 16 |
| Single Bottle Demi-Perm | Color Change Basic + Not short hair + Not Virgin | 1B Roots(15) Ends (5) | 28 |
| Single Bottle Demi-Perm | Color Match + Not Intense Tone + Faded + Not short hair + Not Virgin | 1B Roots(15) Ends(5) | 28 |

This Table 4 or one similar to it may be used to determine the appropriate instructions for a particular colorant. "Intense" colors in Table 4 include brighter reds and lighter blondes. The variables making up the hair characteristics are evaluated as a set of combined variables in order to determine the appropriate instructions to provide to a user. The instruction set is a reference number referring to a pre-generated set of instructions that are associated with a particular combination of treatment type and hair characteristics.

Suitable instructions are generated based upon all of the characteristics input by a user, the type of treatment necessary and the combination of colorants required for the target color and the target tone. The varying elements include the time of application and the locations in the hair to which the colorant elements are applied. These instructions will be included along with the hair colorant provided as a result of this process.

The instructions for each type of hair colorant combination may be different. Even if the user has previously been provided a hair colorant combination, the reformulation colorant combination may be different and may require different instructions as a result. For example, the user may have received two bottles of color for their first order. If this were the user's first time applying hair color, the instructions would have indicated adding color to their ends first, then their roots. However, a reapplication of that same color may only require 1 bottle of hair color and instructions indicating coloring their roots first. In this way, the system must generate appropriate instructions at 450 for the application of the colorant combination.

The manufacturing/distribution system 118 will receive the user order at 452, including all of the information necessary to provide the identified colorant to the user. The order is prepared by the shipping system 120 at 454 and then shipped to the user at 456.

As with an initial order, the system 100 may provide advice to the user on how to use the system and information pertinent to the hair coloration process throughout this process. Help links may be presented to the user in order to aid in identifying hair colors, treatments, hair styles and other characteristics. These links may provide information pertaining to hair treatment, such as suggestions as to the timing of hair coloration after certain treatments or previously coloration. They may also aid users in indicating why certain colors are unavailable to them.

The flow chart has both a start 405 and an end 495, but the system may return to the start of the process or earlier stages in the process at any time. In addition, multiple users may be in various stages of the process simultaneously.

Figure 5:
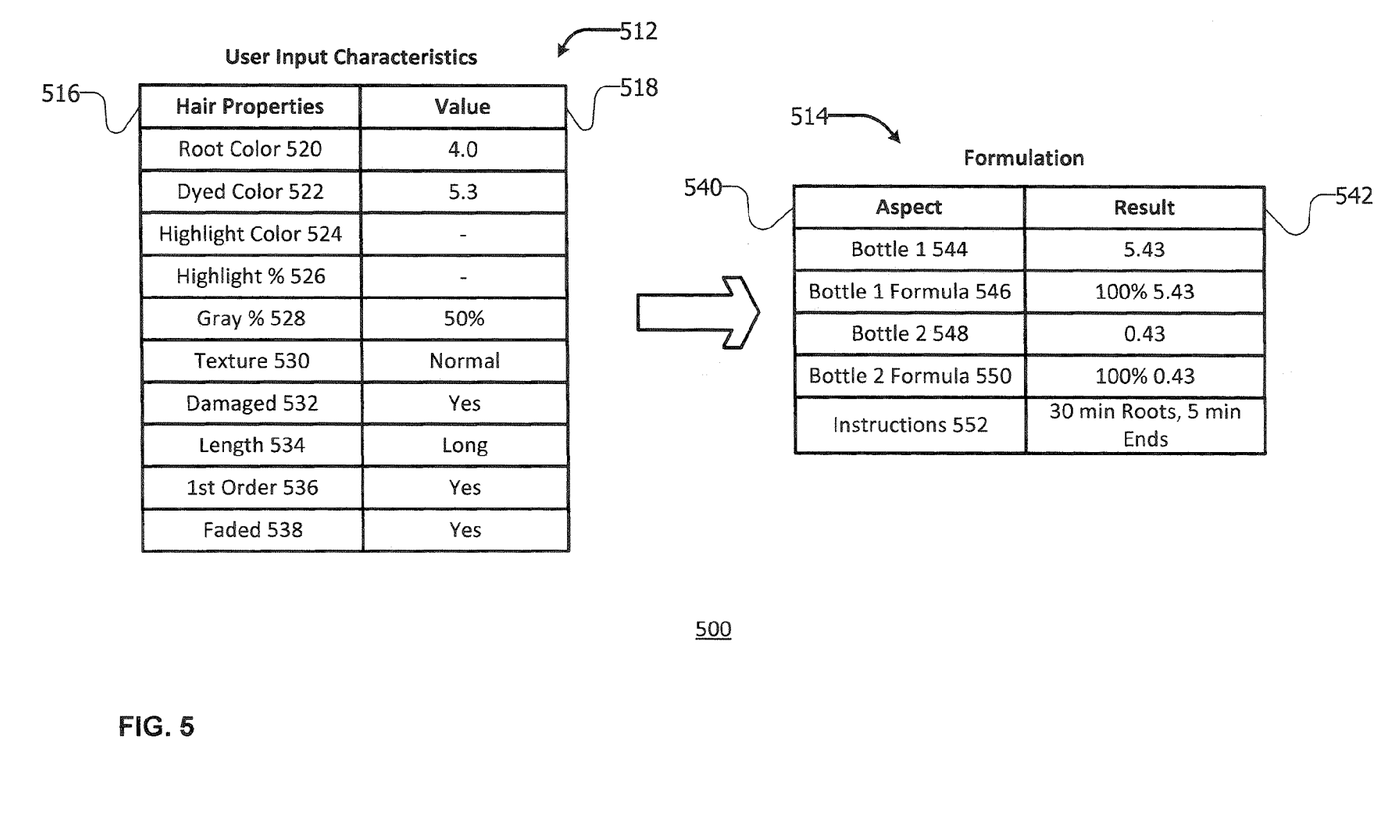
FIG. 5 is an example of user input characteristics and the resulting formula identification.

Turning now to FIG. 5 an example of user input characteristics 512 and the resulting formula supplemental identification 514 is shown. This describes the initial process of formulation in view of these user input characteristics 512. The user input characteristics include the hair properties 516 and the value 518 used to represent those characteristics in the present system. These are both based upon the information provided by a user during the formulation process. More or fewer characteristics may be accepted by the system in making the formulations.

The first element is the root color 520, which in this example has a value of 4.0. As can be seen in Tables 1 and 2 above, 4.0 is representative of a dark brown color with a neutral tone. However, the user's dyed color 522 indicates that the user has dyed their hair to a 5.3, medium brown with a golden tone. The user does not have any highlight color 524 or highlight percentage 526. This is because the user has not added highlights to the hair coloring previously done. However, this user has a natural gray percentage 528 of approximately 50%.

The hair also has a normal texture 530 and is damaged 532. This damage is usually the result of applying coloration to the hair or other treatments. The length 534 of the hair is long. This is a first order 536 which means that this is not a reapplication of color, but a first application. The hair is also faded 538 from the previous application of dye.

The dyed color 522 limits colors to shades of medium brown or darker. Additionally, certain colors in the medium brown shade level are also eliminated as achieving these specific tones is not possible without darkening the overall color. In response to this input and the elimination of unachievable colors from selection, the user has selected to recolor the hair to a 5.43 (medium brown with copper golden tones), different from the previously dyed color 522.

As a result, the formulation 514 is made which is made up of a number of aspects 540 with corresponding results 542. The treatment type selected is a double bottle permanent treatment. Permanent color is required because the user has selected to move one shade lighter than their natural color. If the color were the same or darker than the natural color, then the user could select permanent or demi-permanent colorant. In addition, the user will receive two bottles because of the hair length 534 and the tone that is only to be applied the ends (non-root portion) of the hair.

The bottle 1 544 is to be color 5.43 which includes a base color of a 5.0 (medium brown) and a 0.43 tone (copper golden). The first bottle formula 546 is 100% of the bottle 1 544. Bottle 2 548 is made up of only the 0.43 tone (copper golden). Bottle 2 formulation 550 is 100% of the bottle 2 548 because it is to be used only on the ends of the hair to make the tone of the ends match that of the roots. The 0.43 tone (copper golden) was selected automatically because the copper gold tone will alter the already-dyed hair at 5.3 to the desired color without darkening the hair.

The user is then provided instructions 552 based upon the user input characteristics 512 and the resulting formulation 514. The user is to use the first bottle on the roots for 30 minutes and to use the second bottle on the ends for 5 minutes. The user must use the permanent dye of bottle 1 544 on the roots for 30 minutes in order to lighten the hair to the appropriate shade to match the ends. The user must then use bottle 2 548 on the ends to make the tone of the hair uniform from roots to ends. Ordinarily, a user would be instructed to use bottle 2 548 for 10 minutes on the ends, but this user's hair is already damaged 532 from prior treatment. As a result, less time is recommended. In addition, the user's dyed color is similar to the desired tone. Therefore, less application time is needed on the ends.

Figure 6:
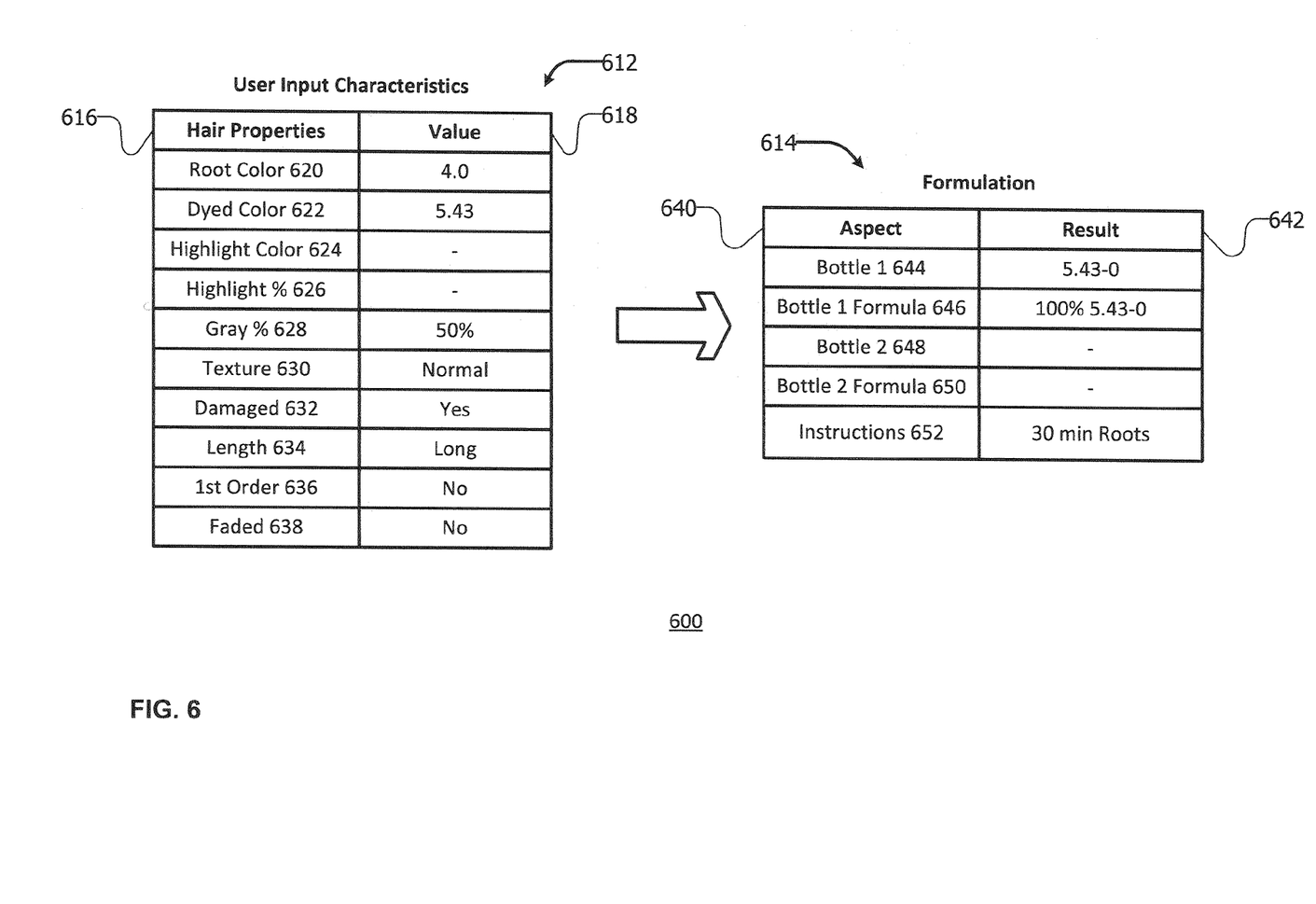
FIG. 6 is an example of user characteristics and the resulting formula supplemental identification.

Turning now to FIG. 6, an example of user characteristics and the resulting reformulation is shown. This is a reformulation for the user of FIG. 5. The hair properties 616 and the associated value 618 are similar to that of FIG. 5. The root color 620 and the dyed color 622 are the same as those in FIG. 5. Because the prior hair was not highlighted and no highlights were added in the prior hair coloration, the highlight color 624 and highlight percentage 626 remain blank. The gray associated with the hair remains 50%.

The hair texture 630 remains the same, "normal" as in FIG. 5 and the hair remains damaged 632. The length 634 also remains the same, "long" as FIG. 5. However, the system is capable of determining, after loading the user's characteristics at 412 (FIG. 4) that this is not the user's first order 636. In addition, based upon the time that has passed since the last order, the system can determine that the hair has not faded 638.

The user has chosen to reorder the same color, 5.43 (medium brown with a copper golden tone). A different color could have been chosen from among the available color choices if the user so desired. Because the user was generally happy with their color, and rather than presenting them with a full chart of available color swatches, the user was presented with textual options for their minor color change. In this case, these chose a slightly deeper color to improve gray coverage.

The resulting formulation for bottle 1 644 is 5.43-0. The –0 indicates that the user made a minor change to their hair colorant. This change will improve the capability of the colorant to cover gray hair. Specifically, the color has slightly more medium brown relative to gold tones which improves the colorant's ability to cover gray hair. The bottle 1 formula 646 calls for 100% of the 5.43-0. In this case, permanent color is required because the user is going from a root color 620 of 4.0 to a target color 644 of 5.43-0 indicating that the user is moving to a lighter shade. If the user were to go to a darker shade, demi-permanent dye may be selected.

Bottle 2 648 and bottle 2 formula 650 are blank because no second bottle is required in this reformulation. In particular, the user need only apply bottle 1 644 to the roots because the remainder of the hair is already colored the dyed color 622 which is identical and because the hair has not faded 638.

The appropriate instructions 652 are generated. The instructions 652 call for a 30 minute application of the entirety of bottle 1 644 to the roots only. The 30 minute application is the default application. Additional or less time would be required for hair that does not take treatment well or that takes treatment very well, respectively.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for custom hair coloring formula supplemental identification comprising:
   accepting a user login, at a server, the user login associated with previously input user characteristics including natural hair color, current hair coloring, hair treatments, hair coloring characteristics and hair treatment characteristics;
   presenting, via the server, a user with an opportunity to order a previously-identified hair colorant associated with the user characteristics;
   accepting user input of a new user characteristic into data stored on the server;
   identifying unavailable hair colors and available hair colors, the unavailable colors and the available hair colors identified based upon the user characteristics;
   providing indicia of the available hair colors to the user;
   accepting user input of desired hair coloring at a server, the desired hair coloring selected from among the available hair colors;
   identifying a new hair colorant, including a formulation different than that of the previously-identified hair colorant, suitable to create the desired hair coloring in view of the new user characteristic; and
   generating an order, using the server, for the new hair colorant.

2. The method of claim 1 wherein user characteristics further include the time of the last hair coloration, the time of the last hair treatment and the current length of hair and the current style of hair.

3. The method of claim 2 wherein the user input of a new user characteristic is accepted in response to a user comparison with the results of a prior hair coloration.

4. The method of claim 2 wherein the identifying a new hair colorant includes a consideration of the natural hair color, the current hair coloring, and the time of the last hair coloration.

5. The method of claim 1 further comprising modifying the new hair colorant based upon user input of a minor colorant change in response to a series of text-based prompts.

6. The method of claim 1 wherein the accepting user input of a new user characteristic includes updating one of natural hair color, current hair coloring and desired hair coloring by a user with reference to a table of hair colors visible on a computer display.

7. The method of claim 1 further comprising:
   processing the order for the new hair colorant to thereby identify and request shipment of the hair colorant; and
   shipping the new hair colorant according to the order.

8. The method of claim 1 wherein the accepting user input of a new user characteristic is completed via a web page and further wherein the user is presented with a number of options from which to choose.

9. An apparatus for custom hair coloring formula supplemental identification, comprising a server configured with program instructions which, when executed, cause the server to:
   accept a user login associated with previously input user characteristics including natural hair color, current hair coloring, hair treatments, hair coloring characteristics and hair treatment characteristics;
   present a user with an opportunity to order a previously-identified hair colorant associated with the user characteristics;
   accept user input of a new user characteristic;
   identify unavailable hair colors and available hair colors, the unavailable colors and the available hair colors identified based upon the user characteristics;
   provide indicia of the available hair colors to the user;
   accept user input of desired hair coloring, the desired hair coloring selected from among the available hair colors;
   identify a new hair colorant, including a formulation different than that of the previously-identified hair colorant, suitable to create the desired hair coloring in view of the new user characteristic; and
   generate an order for the new hair colorant.

10. The apparatus of claim 9 wherein user characteristics further include the time of the last hair coloration, the time of the last hair treatment and the current length of hair and the current style of hair.

11. The apparatus of claim 9 wherein the user input of a new user characteristic is accepted in response to a user comparison with the results of a prior hair coloration.

12. The apparatus of claim 9 wherein the identifying a new hair colorant includes a consideration of the natural hair color, the current hair coloring, and the time of the last hair coloration.

13. The apparatus of claim 9 wherein the server is further for configured to modify the new hair colorant based upon user input of a minor colorant change in response to a series of text-based prompts.

14. The apparatus of claim 9 wherein the acceptance of user input of a new user characteristic includes an update of one of natural hair color, current hair coloring and desired hair coloring by a user with reference to a table of hair colors visible on a computer display.

15. The apparatus of claim 9 further comprising:
   a distribution system for processing the order for the new hair colorant to thereby identify and request shipment of the hair colorant; and
   a shipping system for shipping the new hair colorant according to the order.

16. The apparatus of claim 9 wherein the new user input is accepted via a web page and further wherein the user is presented with a number of options from which to choose.

17. Apparatus comprising a non-transitory storage medium storing program instructions which when executed by a processor will cause the processor to:

accept a user login associated with previously input user characteristics including natural hair color, current hair coloring, hair treatments, hair coloring characteristics and hair treatment characteristics;

present a user with an opportunity to order a previously-identified hair colorant associated with the user characteristics;

accept user input of a new user characteristic;

identify unavailable hair colors and available hair colors, the unavailable colors and the available hair colors identified based upon the user characteristics;

provide indicia of the available hair colors to the user;

accept user input of desired hair coloring, the desired hair coloring selected from among the available hair colors;

identify a new hair colorant, including a formulation different than that of the previously-identified hair colorant, suitable to create the desired hair coloring in view of the new user characteristic; and generate an order for the new hair colorant.

18. The apparatus of claim 17 wherein user characteristics further include the time of the last hair coloration, the time of the last hair treatment and the current length of hair and the current style of hair.

19. The apparatus of claim 17 wherein the user input of a new user characteristic is accepted in response to a user comparison with the results of a prior hair coloration.

20. The apparatus of claim 17 wherein the instruction to identify a new hair colorant includes a consideration of the natural hair color, the current hair coloring, and the time of the last hair coloration.

21. The apparatus of claim 17 further comprising an instruction to modify the new hair colorant based upon user input of a minor colorant change in response to a series of text-based prompts.

22. The apparatus of claim 17 wherein the instruction to accept user input of a new user characteristic includes altering one of natural hair color, current hair coloring and desired hair coloring by a user with reference to a table of hair colors visible on a computer display.

23. The apparatus of claim 17 wherein the instructions further include instructions which when executed by a processor will cause the processor to:

process the order for the new hair colorant to thereby identify and request shipment of the hair colorant; and generate a shipping request in order to ship the new hair colorant according to the order.

24. The apparatus of claim 17 wherein the new user input is accepted via a web page and further wherein the user is presented with a number of options from which to choose.

\* \* \* \* \*